United States Patent [19]

Bonser

[11] Patent Number: 4,881,988

[45] Date of Patent: Nov. 21, 1989

[54] NOVEL FLEXIBLE MAGNET FOR USE IN SMALL DC MOTORS

[75] Inventor: John R. Bonser, Parkersburg, W. Va.

[73] Assignee: RJF International Corporation, Akron, Ohio

[21] Appl. No.: 121,373

[22] Filed: Nov. 16, 1987

[51] Int. Cl.[4] .............................................. H01F 1/09
[52] U.S. Cl. .................................... 148/300; 148/302; 428/587; 428/603; 264/DIG. 58; 252/62.54
[58] Field of Search ...................... 264/108, DIG. 58; 252/62.53, 62.54; 428/603, 587; 148/100, 101, 105, 300, 302, 314

[56] References Cited

U.S. PATENT DOCUMENTS

| | | | |
|---|---|---|---|
| 3,070,841 | 1/1963 | Schornstheimer | 264/22 |
| 3,677,947 | 7/1972 | Ray et al. | 148/100 |
| 3,684,591 | 8/1972 | Martin | 252/62.53 |
| 3,764,539 | 10/1973 | Cochardt et al. | 252/62.53 |
| 3,785,881 | 1/1974 | Naastepad | 148/103 |
| 3,903,228 | 9/1975 | Riedl et al. | 264/108 |
| 4,026,975 | 5/1977 | Kools | 264/24 |
| 4,063,970 | 12/1977 | Steingroever | 148/103 |
| 4,112,320 | 9/1978 | Mohr | 310/154 |
| 4,190,548 | 2/1980 | Baermann | 252/62.54 |
| 4,278,556 | 7/1981 | Tada | 252/62.54 |
| 4,327,346 | 4/1982 | Tada et al. | 252/62.54 |
| 4,462,919 | 7/1984 | Saito et al. | 252/62.54 |
| 4,547,758 | 10/1985 | Shimizu et al. | 264/DIG. 58 |
| 4,689,163 | 8/1987 | Yamashita et al. | 252/62.54 |

FOREIGN PATENT DOCUMENTS

| | | | |
|---|---|---|---|
| 961257 | 1/1975 | Canada . | |
| 125752 | 11/1984 | European Pat. Off. | 148/302 |
| 86809 | 4/1987 | Japan | 264/DIG. 58 |

Primary Examiner—Melvyn J. Andrews
Assistant Examiner—George Wyszomierski
Attorney, Agent, or Firm—Calfee, Halter & Griswold

[57] ABSTRACT

A die head is disclosed for use on an extruder die in which a plate-like structure having an elongated slot through which extrudate is extruded. the slot has a central area which is narrower than the height at each end of the elongated slot. The elongated slot also is arcute in shape, and the central area to each end portion is a mirror image of one another. The die head produces an extrudate which is uniform in thickness throughout a cross-section taken normal to the direction of extrusion, but the extrudate is bowed or arcuate in shape. The combination of a metallic shell and a flexible arcuate magnetic material is also disclosed in which the extruded flexible magnetic strip material is curled within the cylindrical shell such that both the peripheral exterior surface and the peripheral interior surface of the flexible magnetic material is flat in axial cross-section.

11 Claims, 2 Drawing Sheets

NOVEL FLEXIBLE MAGNET FOR USE IN SMALL DC MOTORS

BACKGROUND OF THE INVENTION (1) Field of the Invention

The present invention relates to a novel extruded flexible magnetic strip for use in small DC motors. In particular, the present invention relates to an extruded flexible magnet which has a rectangular cross-section in the axial direction when curled. The present invention also relates to a novel extruder die for making the novel flexible magnetic strip.

(2) Prior Art

Extruded flexible magnetic strips are well-known in the art. Generally, these magnetic strips are made by blending in an extruder a magnetic compound, such as barium ferrite or a rare earth metal-cobalt, such as samarium cobalt, with an elastomeric composition, such as polyvinyl chloride, natural rubber, or polyurethane. To manufacture medium to low strength magnetic fields, magnetic isotropic particles are employed. To manufacture flexible magnet having strong magnetic fields, magnetic anisotropic particles are employed. While the present invention contemplates the use of either isotropic or anisotropic particles in making a flexible magnet, use of magnetic anisotropic particles is preferred.

If anisotropic particles are employed in the flexible magnets, it is necessary to properly orient the anisotropic particles in order to make a strong magnet. Orientation of the anisotropic particles may be achieved by mechanical and/or magnetic orientation, or a combination of these. The following U.S. Patent describes a prior art extrusion mechanical orientation process for making flexible magnetic strips having anisotropic particles therein.

U.S. Pat. No. 3,070,841 to Schornstheimer discloses an extruder for extruding flexible anisotropic magnets. The magnets are made from a composition having anisotropic particles bound by a plastic elastomeric material. By extruding the composition through the die, the anisotropic plate-like magnetic particles are oriented such that their magnetic axis is normal to the direction of extrusion. The efficiency of this orientation is further increased by subjecting the extrudate to further mechanical orientation by passing it between a pair of rollers. Therefore, the extrudate is subject to a dual mechanical orientation process. After the mechanical orientation, the extrudate is magnetized for end-use applications.

Conventionally, small brushless DC motors employ a magnet which has one or more pairs of opposite poles. The magnet is generally placed adjacent a shell which forms the rotor, although the shell and magnet could form the stator, depending upon the design of the DC motor. The magnet is typically formed in a strip by an extruder and rolled or curled into the shell, and anchored therein. Additionally, the magnet for a small DC brushless motor may also be manufactured in a tubular form so that it is inserted into the shell. This type of magnet has certain advantages over a strip magnet which is curled to fit within the shell in that tolerances for small DC motors are very small and a magnet initially formed in a tubular form can more easily be manufactured within the design tolerances. The following patent is exemplary of a tubular form magnet for small DC motors.

U.S. Pat. No. 4,327,346 to Tada et al. discloses an anisotropic polymeric magnet in tubular form in which the mggnetization orientation is directed in a direction perpendicular to the axial line of the tubular magnet. The tubular magnet is formed by injection molding which results in a very high degree of dimensional accuracy, compared to curling an extruded flexible magnet into the shell of a small DC motor.

Injection molded tubular magnets have the disadvantage of requiring different size molds for each size of magnet required in the plethora of small DC motors available in the marketplace. On the other hand, extruded strip flexible magnets can be curled into almost any desired diameter so long as the flexibility of the magnet will permit the curling to occur without cracking or breaking. Thus, while injection molded tubular magnets more precisely control the dimensions of the magnet, the process is not as economical or versatile as a strip extrusion process in which the magnetic material can be curled to fit within the shell.

Extrusion of flexible magnetic material causes several inherent problems, namely: (1) when extruding rectangular shapes from a rectangular die (as shown in FIG. 1), the material tends to be slightly thicker in the central portion of the elongated strip as opposed to the edge portions and is referred to as die swell (as illustrated in FIG. 2); and (2) the edge portions of the extruded material tend to have less oriented anisotropic particles as compared to the central portions. Therefore, the longitudinal edges have less magnetic strength than the central portion. These problems are further compounded when the elongated strip is cut and curled within a shell as illustrated in FIG. 3. The thicker central portion causes the edges of the flexible magnet to be out of contact with the shell resulting in poor circuit continuity. Additionally, the thicker central portion does not permit a uniform magnetic flux to exist within the air gap between the magnet and that portion of the DC motor which fits within the magnet (either the stator or rotor).

These well-known problems have been cured by: (1) designing the die exit opening such that the central area of the die is slightly smaller than the edges (as illustrated in FIG. 4), thus causing the extruded material to have a uniform thickness (as illustrated in FIG. 5); and (2) cutting off the edges of the extruded material to eliminate the portions containing a higher concentration of poorly oriented anisotropic particles, resulting in a flexible magnet having a more uniform magnetic field strength.

Even with the above solutions, using such an extruded elongated material in a small brushless DC motor causes other problems, namely, when the extruded flexible magnet is curled into a small arcuate or circular shape, as depicted in FIG. 6, the magnetic material tends to bend toward the center of the circle along its central elongated length causing the flexible magnet to: (1) only contact the shell along its two peripheral edges causing poor circuitry continuity; and (2) the central portion of the magnet bows inwardly causing a variable magnetic flux to exist between it and the stator.

Thus, there is a need to improve the extrusion process such that: (1) a curled extruded flexible magnet fully contacts the shell across the entire width and along the entire length of the extruded magnet yielding good continuity, and (2) produced a flexible magnet with a flat central portion, i.e., a uniform inside diameter along the entire peripheral circumference of the magnet so that more close tolerances between the rotor and the stator can be achieved yielding uniform magnetic flux in much the same fashion as is achieved by means of tubular formed magnets.

It is a chief aspect of the present invention to create an extrusion die which produces a flexible magnetic isotropic or anisotropic product, which upon being curled has both a flat exterior and interior circumference, and therefore solves the above noted problems.

SUMMARY OF THE INVENTION

The present invention is directed to a double arcuate-shaped die slot which produces a uniform thickness single arc extrudate. This is achieved by making the die slot narrower in its central portion and slightly thicker on its ends. Like the prior art flexible magnets, this feature will produce a uniform thickness extrudate product. Additionally, the present invention has an arcuate shaped die slot for the purpose of producing arcuate flexible magnetic strip which, when curled along the inside of the shell of a DC motor, causes the flexible magnet to contact the shell in a flush manner across its entire width.

In the broadest sense, the present invention is directed to an extruder die having an exit slot with a pair of opposed longitudinal edges and a pair of short edges connecting each end of the longitudinal edges to one another. The actual die slot itself is higher on its edges or ends, and also has an arcuate taper along its longitudinal edges from one side leg to the other.

In the broadest sense, the present invention also includes a flexible magnet produced by extrusion having a uniform thickness throughout and having a slight arcuate shape extending from one longitudinal edge to the other, so that when the flexible magnet is curled into a cylindrical shape with the arcuate taper initially bowing outwardly, the flexible magnet will present a flat exterior and interior peripheral surface across its entire width.

BRIEF DESCRIPTION OF THE DRAWINGS

Other aims and aspects of the invention will become apparent upon reading the following detailed description and upon reference to the drawings, in which.

DESCRIPTION OF THE PREFERRED EMBODIMENTS

The extrudate of the present invention, like prior art flexible magnetic extrudates, are composed of a binder and a magnetic material, i.e., a material capable of producing a magnetic field when magnetized. Generally, it is well known that the extrudate must be extruded within a temperature range depending upon the type of binder employed. If the temperature is too high, instability of the binder results and, on the other hand, if the temperature is too low, the viscosity of the binder is so high that the magnetic material cannot be extruded smoothly and uniformly. Conventionally available binder may be selected from the class of thermoplastics such as PVC, ABS, polyurethane, etc.; thermosets such as melamine-phenolic resins, urea formaldehyde, melamine formaldehyde, polytetrafluoroethylene, or a natural or a synthetic rubber, such as nitrile rubber or styrene-butadiene rubber. Conventionally available magnetic materials are barium ferrite, cobalt-rare earth metal alloys, such as $SmCo_5$, neodymium-iron-rare earth metal alloys, such as $Nd_2Fe_{19}B$, and the like. The magnetic material may be either isotropic or anisotropic. Preferably, the present invention employs anisotropic material. Certain barium ferrites and cobalt-rare earth metal alloys are anisotropic in nature and thus readily available for use with the Present invention.

Figure 1:
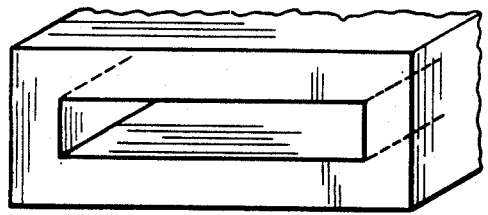
FIG. 1 is a fragmentary, perspective view of a prior art extruder die head having a rectangular exit slot.
Figure 2:
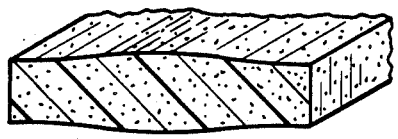
FIG. 2 is fragmentary, perspective view of an extrudate produced from the extruder die head of FIG. 1.
Figure 3:
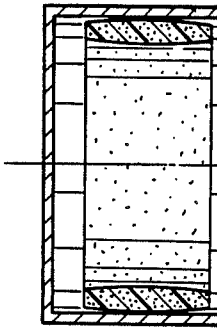
FIG. 3 is a cross-sectional side view of the extrudate of FIG. 2 as it is curled in a metal shell of a small DC motor.
Figure 5:
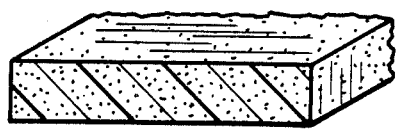
FIG. 5 is a fragmentary, perspective view of an extrudate produced from the prior art die head of FIG. 4.

As illustrated and previously discussed, the flexible magnetic extrudates shown in FIGS. 2 and 5 are not capable of meeting tight tolerances in small DC motors. Thus, the prior art flexible magnets produced in bar form must be machined generally in the motor in order to achieve the necessary close tolerances. The present invention overcomes the problems of the prior art flexible magnets designed to be employed in small DC motors.

By small DC motors, it is meant motors in which the diameter of the flexible magnet is from 1 (or smaller) to 12 inches in diameter. Small DC motors which have a flexible magnet diameter greater than about 12 inches produce an insignificant gap, or no gap at all, when the extrudate of FIG. 5 is curled within the shell. The present invention works best in small DC motors having a flexible magnet diameter of from about 2 to about 6 inches in diameter.

In studying prior art DC motors employing flexible magnets extruded in an elongated form and curled in the shell of the magnet, the present inventor found that a flexible magnet which fully contacts the interior circumference of the shell produces a better magnetic flux. This improves the efficiency of small DC motors. The speed in revolutions per minute of a small DC motor is directly affected by the voltage, current and resistance applied thereto and indirectly to the number of magnetic poles, the magnetic flux and other factors. The magnetic flux is calculated to be equal to the product of the flux density $B_m$ and the area of the flexible magnet's surface adjacent the shell. The useful work performed by the motor is related to the torque of the motor which under ideal conditions is directly proportional to the current draw of the armature and inversely proportional to the magnetic flux coupling to the armature. Optimal efficiency of the motor then involves a tradeoff between minimizing current draw on the armature (which keeps the speed of the motor high) yet not reducing the useful torque available for work. Increasing the available flux from the magnet becomes a significant way of increasing torque without changing the geometry of the motor or increasing the amount of copper in the windings (to reduce its resistance) both of which incur significant cost penalties.

For a given magnetic material, the highest magnetic flux per unit area of magnetic material is obtained under the condition of the highest permanence coefficient, which is ideally proportional to the ratio of the thickness of the magnet, divided by the distance between the surface of the magnet and the rotor (or stator) which is termed the "air gap". The total magnetic flux then is the magnetic flux per unit area times the total magnet area in contact with the stator cup which completes the magnetic circuit. In summary then, the smaller the Physical air gap the higher the magnetic flux per unit area (because of the higher permanence coefficient), and the better the physical contact between the magnet and the stator cup the more flux that gets pumped into the magnetic circuit, maximizing the available magnetic flux for torque. Thus, it would be most important to manufacture a flexible magnet which upon being extruded and curled into a shell will possess flat characteristics along its interior circumference. With flat characteristics, the physical air gap can be made very small thereby improving the flux per unit area, while at the same time maximize the stator cup wall contact and thereby improving the total amount of flux being pumped into the magnetic circuit.

Figure 7:
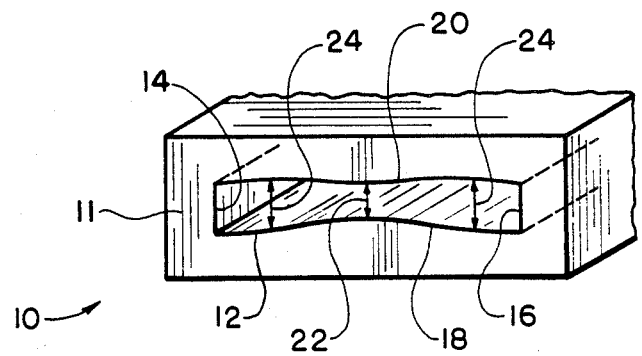
FIG. 7 is a fragmentary, perspective view of an extruder die head of the present invention showing the new design exit slot.

In order to produce a flexible magnet capable of contacting the metal shell flushly about its exterior circumference and to create a flat surface across the interior circumference of the flexible magnet so as to achieve a small physical air gap, the present inventor developed the extruder die head generally represented by reference numeral 10 as shown in FIG. 7. The extruder die head 10, illustrated in FIG. 7, has an exit face plate-like structure 11 generally made from metal so as to withstand the pressures normally created by an extruder. The plate-like structure 11 may be formed from a single metallic plate, or the plate-like structure 11 may be formed from a plurality of metallic parts which present a plate-like appearance. The plate 11 has an exit slot 12 through which exits the extrudate or flexible magnetic material. The exit slot 12 comprises a pair of short legs 14, 16 and a pair of longitudinal legs 18, 20. The short legs 14, 16 connect the ends of the longitudinal legs 18, 20 as clearly shown in FIG. 7.

Figure 4:
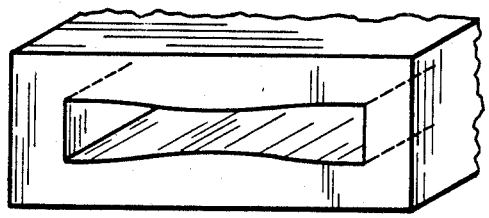
FIG. 4 is a fragmentary, perspective view of a prior art extruder die head illustrating another prior art exit slot design.

In order to create a flexible magnetic material with the extruder die head 10, it is necessary that the central portion of the extrudate not be thicker as illustrated in FIG. 2. To overcome this problem of die swell, the central portion of the slot 12 is slightly narrower, as shown by reference numeral 22, than the edges and remainder of the cross section of the extrudate as is shown by arrows 24. Note that this feature is also shown in FIG. 4 as prior art and produces the FIG. 5 extrudate which has a substantially uniform thickness across its entire cross section. With the present invention, however, the narrow opening 22 occurs in an arcuate slot opening 12. The arcuate opening 12 is formed with the longitudinal sides 18, 20 of the slot 12 being arcuate. The arcuate feature of the die 10 produces the extrudate generally represented by reference numeral 30 in FIG. 8. The extrudate 30 has a substantially uniform thickness throughout its cross section, however, the extrudate is slightly arcuate such that its center section 32 is higher (from the viewpoint illustrated in FIG. 8) than each end section 34, 36. Moreover, the top surface 38 and the bottom surface 39 are bowed or arcuate in shape and are substantially parallel to one another because the extrudate 30 is of uniform thickness. The raised center portion 32 is raised approximately 0.010 to 0.15 inches per 0.1 inches of thickness of the flexible magnetic compound or extrudate 30. In other words, the thicker the extrudate, the more curvature is required, while thinner extrudates require less curvature.

Figure 8:
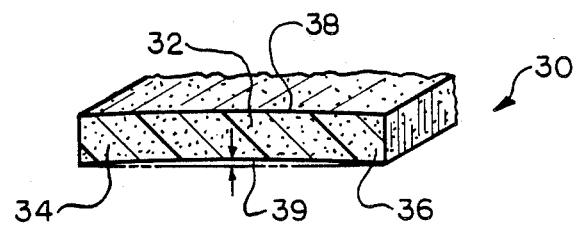
FIG. 8 is a fragmentary perspective view of the extrudate of the present invention produced by the novel extruder head of FIG. 7.
Figure 9:
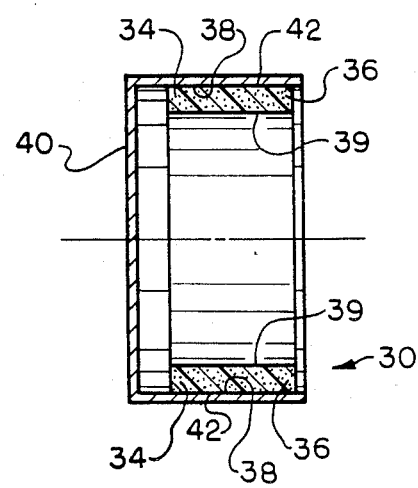
FIG. 9 is a cross-sectional side view of the extrudate of FIG. 8 curled into a metal shell of a small DC motor.

The curvature is necessary in order to produce a flexible magnetic composition which, when curled upon itself, as shown in FIG. 9, presents a substantially flat exterior or outer circumference across its entire cross-section. As shown in FIG. 9, the extrudate 30 is positioned within a shell 40 such that the top surface 38 having the downwardly curved arc, as shown in FIG. 8, is positioned juxtaposed the inner circumferential surface 42 of the shell 40. When the top surface 38 becomes the exterior periphery or circumference of the curled extrudate, it presents a flat surface across its entire periphery and cross section as illustrated in FIG. 9. This ensures complete contact between the flexible magnet 30 and the metal cup or shell 40, thereby providing a complete circuit between the stator and rotor. Additionally, the bowed bottom surface 39 of the extrudate 30 likewise produces a flat surface when the extrudate is curled upon itself, as illustrated in FIG. 9. Thus, the flat curled bottom surface 39 allows for very close tolerances with the stator or rotor (not shown) which fits within the interior of the magnet 30 as it is positioned within the interior of the shell 40. Thus, the close tolerances achieved by the present invention result in superior magnetic flux, thereby increasing the overall uniform efficiency of small DC motors.

Figure 6:
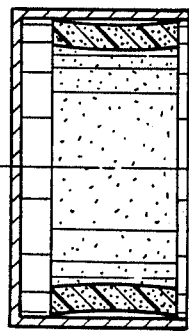
FIG. 6 is a cross-sectional side view of the extrudate of FIG. 5 curled into a cylindrical shell of a small DC motor.

Thus the inventor of the present invention found that a better magnetic flux is achieved by closer tolerances and the necessity to achieve good continuity by flush contact between magnet 30 and shell 40. This is achieved by the present invention in which the flexible magnetic strip extrudate is manufactured by a die which gives the strip extrudate a permanent curvature. When the curved extrudate is curled into a diameter of between about 1 and about 12 inches in diameter, the extrudate presents a flat surface along both its interior and exterior peripheries. This achieves a more uniform efficiency and a higher magnetic flux with DC motors because tighter tolerances can be achieved without mechanically cutting or otherwise flattening the surfaces of the prior art extrudate as would be necessary for the magnetic composition curled within the shell shown in FIG. 6.

Thus, it is apparent that there has been provided, in accordance with the invention, a die, an extrudate, and a combination shell and curled flexible magnet for DC motors that fully satisfies the aims, aspects, features and advantages set forth above. While the invention has been described in conjunction with specific embodiments thereof, it is evident that any alternatives, modifications, and variations will be apparent to those skilled in the art in light of the foregoing description. Accordingly, the present invention is intended to embrace all such alternatives, modifications, and variations that fall within the spirit and broad scope of the invention.

What is claimed is:

1. A extrudate for use as a flexible tubular magnet comprising an extruded strip of flexible, magnetic material;

said strip having a flexibility which enables said strip to be curled into a tubular, cylindrical form;

said strip extending from a first end to a second end and being adapted so that upon being curled into said tubular, cylindrical form said first and second ends are adjacent each other;

said strip having first and second arcuate surfaces extending from said first end to said second end, said first and second arcuate surfaces being parallel to each other so that said strip has a bowed profile and a substantially uniform thickness;

the bow of said strip being from about 0.01 to about 0.15 inch per 0.1 inch of thickness;

said strip having a longitudinal central axis extending from said first end to said second end, and each of said first and second arcuate surfaces being parallel to said longitudinal surface and having a consistent curvature relative to said longitudinal central axis over the entire length of said longitudinal central axis;

said first and second arcuate surfaces defining concave and convex surfaces, respectively, on the exterior of said strip;

said first and second arcuate surfaces being oriented such that said first surface defines the inner surface and second surface defines the outer surface of said tubular, cylindrical form, upon said strip being curled into said form; and the flexibility of said strip and the curvature of said first and second arcuate surfaces being such that said first and second arcuate surfaces are flexible into parallel, substantially cylindrical orientations as said strip is being curled into said tubular, cylindrical form; so that said tubular, cylindrical form has parallel, cylindrical inner and outer surfaces and a substantially uniform thickness.

2. An extrudate for use as a flexible, tubular magnet comprising an extruded strip of flexible, magnetic material comprising a polymeric binder and magnetic particles;

said strip having a flexibility which enables said strip to be curled into a tubular, cylindrical form;

said strip extending from a first end to a second end and being adapted so that upon being curled into said tubular, cylindrical form said first and second ends are adjacent each other;

said strip having first and second arcuate surfaces extending from said first end to said second end, said first and second arcuate surfaces being parallel to each other so that said strip has a bowed profile and a substantially uniform thickness;

said first and second arcuate surfaces defining concave and convex surfaces, respectively, on the exterior of said strip;

said strip having a longitudinal central axis extending from said first end to said second end, each of said first and second arcuate surfaces being parallel to said longitudinal surface and having a consistent curvature relative to said longitudinal central axis over the entire length of said longitudinal central axis;

the width of said strip being constant over the entire length of said longitudinal central axis;

said first and second arcuate surfaces being oriented such that said first surface defines the inner surface and said second surface defines the outer surface of said tubular cylindrical form, upon said strip being curled into said form;

the flexibility of said strip and the curvature of said first and second arcuate surfaces being such that said first and second arcuate surfaces are flexible into parallel, substantially cylindrical orientations as said strip is being curled into said tubular, cylindrical form; so that said tubular, cylindrical form has parallel cylindrical inner and outer surfaces and a substantially uniform thickness; and said strip upon being curled into said tubular cylindrical form and incorporated into a surrounding cylindrical motor shell of a permanent magnet motor producing a substantially uniform contact with the surrounding cylindrical motor shell and a relatively constant air gap with a rotor or stator disposed therein, thereby maximizing the magnetic flux available from said strip when incorporated into said permanent magnet motor.

3. The extrudate of claim 2 whereby the extrudate has a longitudinal central axis which divides said extrudate into two substantially equal halves and a cross-section of said extrudate in a plane normal to the longitudinal central axis has bilateral symmetry.

4. The extrudate of claim 3, wherein said polymeric binder is a thermoplastic, a thermoset, or a natural or synthetic rubber.

5. The extrudate of claim 4, wherein said magnetic particles are anisotropic.

6. The extrudate of claim 4, wherein said magnetic particles are isotropic.

7. The extrudate of claim 4, wherein said magnetic particles are selected from the class consisting of ferrite composition, a neodymium composition, or cobalt composition.

8. The extrudate of claim 7, wherein said ferrite composition includes barium ferrite.

9. The extrudate of claim 7, wherein said cobalt composition includes cobalt and rare-earth metals.

10. The extrudate of claim 9, wherein said rare-earth metals include samarium.

11. The extrudate of claim 7, wherein said neodymium composition includes iron and boron.

* * * * *